(12) United States Patent
Jeong et al.

(10) Patent No.: US 9,081,460 B2
(45) Date of Patent: Jul. 14, 2015

(54) ELECTRONIC DEVICE, METHOD FOR MANUFACTURING THE SAME AND TOUCH PANEL INCLUDING THE SAME

(75) Inventors: Huisu Jeong, Gwangju (KR);
Gun-Young Jung, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 344 days.

(21) Appl. No.: 13/475,341

(22) Filed: May 18, 2012

(65) Prior Publication Data

US 2012/0292162 A1   Nov. 22, 2012

Related U.S. Application Data

(60) Provisional application No. 61/488,154, filed on May 20, 2011.

(30) Foreign Application Priority Data

May 18, 2012  (KR) .................. 10-2012-0052979

(51) Int. Cl.
*H01B 13/00* (2006.01)
*G06F 3/045* (2006.01)
*B82Y 10/00* (2011.01)

(52) U.S. Cl.
CPC ............ *G06F 3/045* (2013.01); *B82Y 10/00* (2013.01); *G06F 2203/04103* (2013.01)

(58) Field of Classification Search
CPC ............ B82Y 10/00; G06F 2203/04103; G06F 3/045; G06F 3/041
USPC ........ 216/13, 41, 83; 977/887, 890, 952, 953; 427/126.3
See application file for complete search history.

(56) References Cited

U.S. PATENT DOCUMENTS

2007/0202673 A1   8/2007   Kim et al.
2009/0211819 A1*  8/2009   Wang et al. ............... 178/18.03

(Continued)

FOREIGN PATENT DOCUMENTS

KR    20060042144 A    5/2006
KR    20090131171 A    12/2009

OTHER PUBLICATIONS

Han, Chang-Soo et al., "Growth of carbon nanotube and nano patterning of metal for mimicking artificial stereocilia", Jun. 2006 (4 pages).

(Continued)

*Primary Examiner* — Shamim Ahmed
(74) *Attorney, Agent, or Firm* — Osha Liang LLP (57) ABSTRACT

Provided are an electronic device, a method of manufacturing the same, and a touch panel including the device. The electronic device includes a nanostructure having a plurality of metal oxide nanorods vertically aligned at predetermined intervals in intersection regions between bottom electrodes and top electrodes that perpendicularly cross each other. The nanorods are formed to the same diameter and the same height so that the electronic device can exhibit uniform performance. Also, a method of manufacturing an electronic device includes selectively vertically growing the same number of metal oxide nanostructures with a uniform size only on the bottom electrodes using a nano-template with a plurality of vertical holes. Furthermore, a touch panel includes a nanostructure having a plurality of piezoelectric nanorods disposed in a plurality of touch cells arranged in a matrix.

5 Claims, 6 Drawing Sheets

(56) References Cited

U.S. PATENT DOCUMENTS

| | | |
|---|---|---|
| 2009/0309843 A1 | 12/2009 | Kim et al. |
| 2011/0049467 A1* | 3/2011 | Cho et al. ............ 257/10 |
| 2011/0195141 A1* | 8/2011 | Muhammad et al. ...... 425/385 |
| 2011/0247548 A1* | 10/2011 | Jung et al. ............ 117/58 |
| 2012/0148844 A1* | 6/2012 | Whitcomb ............ 428/401 |

OTHER PUBLICATIONS

Office Action issued in Korean Application No. 10-2012-0052979; Dated Sep. 30, 2013 (6 pages).

* cited by examiner

ELECTRONIC DEVICE, METHOD FOR MANUFACTURING THE SAME AND TOUCH PANEL INCLUDING THE SAME

BACKGROUND

1. Technical Field

Example embodiments of the present invention relate in general to an electronic device, a method of manufacturing the same, and a touch panel including the device, and more specifically to an electronic device including metal oxide nanostructures vertically aligned in intersection regions between electrodes disposed in a crossbar formation, a method of manufacturing the device, and a touch panel including the device.

2. Related Art

A vast amount of research has been conducted into new electronic devices using nanostructures of materials. Nanostructures with a size of several tens of nm, such as quantum dots, nanoparticles, nanorods, nanotubes, quantum wells, and nano-composites, exhibit completely different optical, electrical, magnetic, and genetic properties from a conventional thin layer or bulk material due to electron confinement. Research into technology for increasing operating efficiency of a device at low power using characteristics of the nanostructures has progressed.

However, since 1-dimensional nanostructures should be separately controlled to manufacture devices including the nanostructures, when the devices including the nanostructures are manufactured using conventional semiconductor process, not only is it difficult to mass produce the devices but they may be prone to malfunction and contamination.

Furthermore, it is not easy to manufacture nanostructures with uniform electrical properties by equalizing the length of the respective nanostructures, and it is difficult to precisely align the nanostructures in desired regions.

Meanwhile, a touch panel is typically installed in a display device, such as a personal digital assistant (PDA) or a light crystal display (LCD), and used as an information input unit. The touch panel may be an input apparatus in which a selection menu is displayed on a display so that a user can simply drive the display apparatus.

It is known that, among various types of touch panels, a resistive-type touch panel is more advantageous than other types of touch panels in terms of thickness, size, weight, and power consumption.

In general, a resistive-type touch panel may include an upper substrate and a lower substrate disposed opposite each other, a transparent conductive layer may be coated on the upper and lower substrates, and electrodes may be formed at both ends of the transparent conductive layer. A dot spacer may be formed on the lower substrate to insulate the transparent conductive layer formed on the upper and lower substrates, and the upper and lower substrates may be encapsulated using a bond or an adhesive film.

Accordingly, when the upper substrate of the touch panel is pushed by a user's fingers or a tool, the upper and lower substrates may be brought into contact with each other, and a position of contact between the upper and lower substrates may be detected so that the touch panel can function as an input apparatus.

However, in a conventional resistive-type touch panel, when at least two points are simultaneously touched (i.e., when a multi-touch occurs), an electrical short occurs between the at least two points so that the touched points cannot be calculated. Also, an additional power source is required to put upper and lower substrates in an equipotential state.

SUMMARY

Accordingly, example embodiments of the present invention are provided to substantially obviate one or more problems due to limitations and disadvantages of the related art.

Example embodiments of the present invention provide an electronic device including metal oxide nanostructures vertically aligned in intersection regions between electrodes disposed in a crossbar formation, wherein the metal oxide nanostructures are formed to a uniform size in an equal number in each and every one of the intersection regions between the crossbar-type electrodes.

Other example embodiments of the present invention provide a touch panel that may embody a multi-touch function using a simple structure and exhibit uniform performance throughout the entire cells.

In some example embodiments, an electronic device includes a bottom electrode, a top electrode formed to perpendicularly intersect the bottom electrode, and a nanostructure formed in an intersection region between the bottom electrode and the top electrode, the nanostructure having a plurality of metal oxide nanorods periodically aligned in a vertical direction.

The plurality of metal oxide nanorods may have the same diameter and height. The metal oxide nanorods may include at least one selected from the group consisting of zinc oxide (ZnO), copper oxide (CuO), barium oxide ($BaCO_3$), bismuth oxide ($Bi_2O_3$), boron oxide ($B_2O_3$), calcium carbonate ($CaCO_3$), cerium oxide ($CeO_2$), chromium oxide ($Cr_2O_3$), iron oxide ($Fe_2O_3$), gallium oxide ($Ga_2O_3$), indium oxide ($In_2O_3$), lithium carbonate ($Li_2CO_3$), lithium cobalt oxide ($LiCoO_2$), magnesium oxide (MgO), manganese carbonate ($MnCO_3$), manganese oxide ($MnO_2$, $Mn_3O_4$), niobium oxide ($Nb_2O_5$), lead oxide (PbO), antimony oxide ($Sb_2O_3$), tin oxide ($SnO_2$), strontium carbonate ($SrCO_3$), tantalum oxide ($Ta_2O_5$), titanium oxide ($TiO_2$), barium titanate ($BaTiO_3$), vanadium oxide ($V_2O_5$), tungsten oxide ($WO_3$), and zirconium oxide ($ZrO_2$).

The bottom electrode may be an indium tin oxide (ITO) electrode, the top electrode may be a platinum (Pt) electrode, and the metal oxide nanorods may be zinc oxide (ZnO) nanorods.

In other example embodiments, a method of manufacturing an electronic device includes forming a plurality of bottom electrodes arranged on a substrate parallel to one another, forming a metal oxide seed layer on the entire surface of the substrate having the bottom electrodes, forming a nano-template having a plurality of vertical holes on the metal oxide seed layer, forming metal oxide nanostructures on the bottom electrodes in a vertical direction with respect to the substrate by growing the metal oxide seed layer exposed through the holes of the nano-template, and forming top electrodes on the metal oxide nanostructures.

The nano-template may contain an insulating polymer. The formation of the nano-template may include preparing a nanoimprinting stamp having a plurality of pillars, coating a light-curable resist on the entire surface of the metal oxide seed layer and applying pressure using the nanoimprinting stamp, irradiating the light-curable resist with light to cure the light-curable resist and removing the nanoimprinting stamp, and etching the residual light-curable resist in the imprinted holes until the metal oxide seed layer formed on the bottom electrodes is exposed.

The metal oxide nanostructures may be a plurality of metal oxide nanorods periodically aligned in a vertical direction. The formation of the metal oxide nanostructures may include disposing the substrate on which the nano-template having the plurality of vertical holes is formed in a hydrothermal solution and growing the metal oxide nanostructures along the holes.

In still other example embodiments, a touch panel includes a lower substrate, an upper substrate disposed opposite the lower substrate, a plurality of bottom electrodes arranged on the lower substrate parallel to one another, a plurality of top electrodes arranged on a bottom surface of the upper substrate parallel to one another, the plurality of top electrodes formed to perpendicularly intersect the bottom electrodes, and piezo-electric nanostructures formed in intersection regions between the bottom electrodes and the top electrodes. The piezoelectric nanostructures are a plurality of metal oxide nanorods arranged periodically, and each and every one of the intersection regions includes the same number of metal oxide nanorods.

The piezoelectric nanostructures may include at least one selected from the group consisting of $ZnO$, $MgO$, $TiO_2$, $SnO_2$, and $CdO$. The top electrodes and the bottom electrodes may be transparent electrodes.

BRIEF DESCRIPTION OF DRAWINGS

The above and other features and advantages of the present invention will become more apparent by describing in detail example embodiments of the present invention with reference to the accompanying drawings, in which.

DESCRIPTION OF EXAMPLE EMBODIMENTS

While example embodiments of the present invention are disclosed herein, their specific structural and functional details are merely examples taken for descriptive purposes only. The present invention may be embodied in many alternate forms and should not be construed as limited to example embodiments set forth herein.

Accordingly, while the invention is susceptible to various modifications and may take on various alternative forms, specific embodiments thereof are shown by way of example in the drawings and will herein be described in detail. It should be understood, however, that there is no intent to limit the invention to the particular forms disclosed. On the contrary, the invention is to cover all modifications, equivalents, and alternatives falling within the spirit and scope of the claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

It will be understood that when a layer is referred to as being "on" another layer or substrate, it can be directly on the other layer or substrate or intervening layers may also be present. Terms that describe spatial relationships, such as "beneath", "below", "lower", "above", "upper" and the like, may be used herein for ease of description to describe one element or feature's relationship to another element(s) or feature(s) as illustrated in the figures. It will be understood that such terms are intended to encompass different orientations of the device in use or operation in addition to the orientation(s) depicted in the figures. For example, if the device in the figures is turned over, elements described as "below" or "beneath" other elements or features would then be oriented "above" the other elements or features. Thus, the term "below" can encompass both an orientation of above and below. The orientation of the device may be changed in other ways (e.g., rotated 90 degrees or some other angle) and spatial relationships described herein should be interpreted within the context of the changed orientation.

In the drawings, the thicknesses of layers and regions may be exaggerated for clarity. Like reference numerals refer to like elements throughout.

Figure 1:
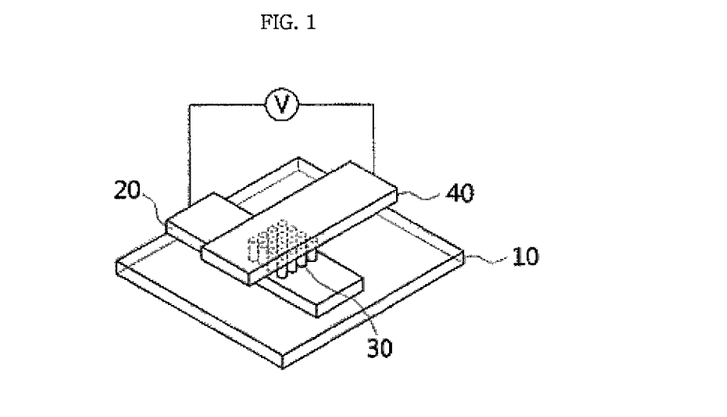
FIG. 1 is a perspective view of an electronic device according to an example embodiment of the present invention.

FIG. 1 is a perspective view of an electronic device according to an example embodiment of the present invention.

Referring to FIG. 1, a bottom electrode 20 may be disposed on a substrate 10. The substrate 10 may be a transparent inorganic substrate formed of glass, quartz, or aluminum oxide ($Al_2O_3$). Also, the substrate 10 may be a transparent organic substrate formed of polyethylene terephthalate (PET), polystyrene (PS), polyimide (PI), polyvinyl chloride (PVC), polyvinylpyrrolidone (PVP), or polyethylene (PE). Subsequently, the substrate 10 may be removed.

The bottom electrode 20 may be a transparent electrode. In an example, the bottom electrode 20 may contain a transparent conductive oxide (TCO). For example, the TCO may be selected from the group consisting of ITO, doped zinc oxide (aluminum (Al)-doped ZnO (AZO), gallium (Ga)-doped ZnO (GZO), indium (In)-doped ZnO (IZO), In/Ga-doped ZnO (IGZO), magnesium (Mg)-doped ZnO (MZO)), aluminum (Al)-doped or Ga-doped MgO, tin (Sn)-doped $In_2O_3$, fluorine (F)-doped $SnO_2$, and niobium (Nb)-doped $TiO_2$. However, the present invention is not limited thereto, and one of various TCOs having conductivity may be used.

Also, the bottom electrode 20 may be a metal electrode. For instance, the metal may be selected from the group consisting of aluminum (Al), gold (Au), copper (Cu), platinum (Pt), silver (Ag), tungsten (W), nickel (Ni), zinc (Zn), titanium (Ti), zirconium (Zr), hafnium (Hf), cadmium (Cd), palladium (Pd), and an alloy thereof.

A plurality of bottom electrodes 20 may be disposed on the substrate 10. In this case, the plurality of bottom electrodes 20 may be disposed parallel to one another.

A top electrode 40 may be formed to perpendicularly intersect the bottom electrode 20. That is, the top electrode 40 and the bottom electrode 20 may be formed to have a crossbar-type structure. A crossbar-type arrangement of electrodes may facilitate manufacture of devices and be advantageous in increasing the integration density of the devices.

A plurality of top electrodes 40 may be disposed. The plurality of top electrodes 40 may be disposed parallel to one another. The top electrode 40 may be formed of the same material as the bottom electrode 20.

The nanostructure 30 may be formed in an intersection region between the bottom electrode 20 and the top electrode 40. The nanostructure 30 may be a plurality of metal oxide nanorods arranged periodically. For example, the metal oxide may include at least one selected from the group consisting of zinc oxide (ZnO), copper oxide (CuO), barium oxide ($BaCO_3$), bismuth oxide ($Bi_2O_3$), boron oxide ($B_2O_3$), calcium carbonate ($CaCO_3$), cerium oxide ($CeO_2$), chromium oxide ($Cr_2O_3$), iron oxide ($Fe_2O_3$), gallium oxide ($Ga_2O_3$), indium oxide ($In_2O_3$), lithium carbonate ($Li_2CO_3$), lithium cobalt oxide ($LiCoO_2$), magnesium oxide (MgO), manganese carbonate ($MnCO_3$), manganese oxide ($MnO_2$), $Mn_3O_4$, niobium oxide ($Nb_2O_5$), lead oxide (PbO), antimony oxide ($Sb_2O_3$), tin oxide ($SnO_2$), strontium carbonate ($SrCO_3$), tantalum oxide ($Ta_2O_5$), titanium oxide ($TiO_2$), barium titanate ($BaTiO_3$), vanadium oxide ($V_2O_5$), tungsten oxide ($WO_3$), and zirconium oxide ($ZrO_2$).

The plurality of metal oxide nanorods may be aligned in a vertical direction with respect to the substrate 10. The respective metal oxide nanorods may be disposed an equal distance apart from one another and have the same diameter and height. In this case, the diameter and height of the metal oxide nanorods may be variously selected according to an applied field.

Furthermore, when a plurality of bottom electrodes 20 and a plurality of top electrodes 40 are provided, each of a plurality of nanostructures 30 formed in respective intersection regions between the bottom electrodes 20 and the top electrodes 40 may have the same number of metal oxide nanorods.

As described above, an electronic device according to an example embodiment of the present invention may be used as a photodetector configured to detect ultraviolet (UV) light. When the metal oxide nanostructures 30 are irradiated with UV light, electron-hole pairs may be formed. In this case, a depletion layer present in each of the metal oxide nanostructures 30 may be reduced. Accordingly, the electrical conductivity of the metal oxide nanostructures 30 may be increased, and an increase in the electrical conductivity of the metal oxide nanostructures 30 may be sensed to detect UV light.

In the electronic device according to the example embodiment of the present invention, since the same number of metal oxide nanorods are provided in each of pixels formed by the intersection regions, uniform device performance may be obtained. Also, since the metal oxide nanorods are disposed apart from one another, interference between adjacent nanorods may be prevented during transport of electrons, thereby resulting in a high electron transport capability.

FIGS. 2A through 2E are cross-sectional views illustrating respective processes of a method of manufacturing an electronic device according to an example embodiment of the present invention.

FIGS. 3A through 3E are cross-sectional views illustrating a nanoimprint lithography process according to an example embodiment of the present invention.

Figure 2A:
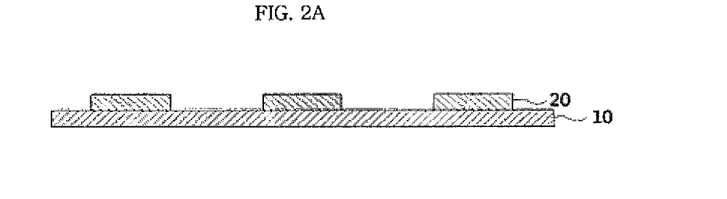
FIGS. 2A through 2E are cross-sectional views illustrating processes of a method of manufacturing an electronic device according to an example embodiment of the present invention.

Referring to FIG. 2A, a plurality of bottom electrodes 20 may be formed on a substrate 10. The formation of the plurality of bottom electrodes 20 on the substrate 10 may be performed using ordinary deposition and lithography processes. The plurality of bottom electrodes 20 may be formed a predetermined distance apart from one another and parallel to one another.

The substrate 10 may be a transparent inorganic substrate or a transparent organic substrate. The bottom electrode 20 may be a TCO electrode or a metal electrode.

Figure 2B:
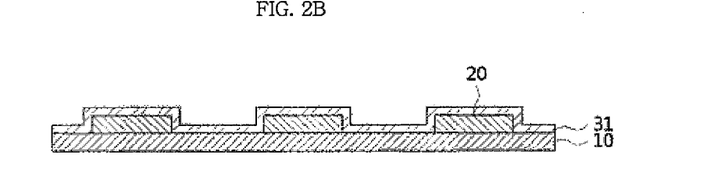

Referring to FIG. 2B, a metal oxide seed layer 31 may be formed on the entire surface of the substrate 10 having the bottom electrodes 20. In this case, the metal oxide seed layer 31 may be formed to a thickness of about 20 nm or less. In an example, the metal oxide seed layer 31 may be formed by coating a sol solution containing a metal oxide precursor on the entire surface of the substrate 10 having the bottom electrodes 20 and performing an annealing process.

For instance, the sol solution containing the metal oxide precursor may be a sol solution containing a precursor constituting zinc oxide (ZnO), copper oxide (CuO), barium oxide ($BaCO_3$), bismuth oxide ($Bi_2O_3$), boron oxide ($B_2O_3$), calcium carbonate ($CaCO_3$), cerium oxide ($CeO_2$), chromium oxide ($Cr_2O_3$), iron oxide ($Fe_2O_3$), gallium oxide ($Ga_2O_3$), indium oxide ($In_2O_3$), lithium carbonate ($Li_2CO_3$), lithium cobalt oxide ($LiCoO_2$), magnesium oxide (MgO), manganese carbonate ($MnCO_3$), manganese oxide ($MnO_2$), $Mn_3O_4$, niobium oxide ($Nb_2O_5$), lead oxide (PbO), antimony oxide ($Sb_2O_3$), tin oxide ($SnO_2$), strontium carbonate ($SrCO_3$), tantalum oxide ($Ta_2O_5$), titanium oxide ($TiO_2$), barium titanate ($BaTiO_3$), vanadium oxide ($V_2O_5$), tungsten oxide ($WO_3$), and zirconium oxide ($ZrO_2$). A spin coating process, a deep coating process, a drop coating process, or a spray coating process may be used to coat the sol solution on the substrate 10. The annealing process may be performed at a temperature of about 300° C. to about 700° C.

Figure 2C:
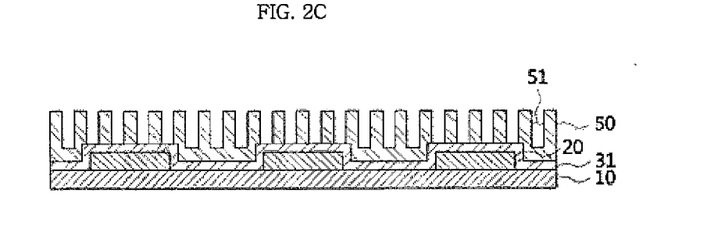

Referring to FIG. 2C, a nano-template 50 having a plurality of vertical holes 51 may be formed on the metal oxide seed layer 31.

In an example, the nano-template 50 may be formed by a nanoimprint lithography process using UV light. A nanoscaled pattern, which is an ultrafine pattern, may be formed using the nanoimprint lithography process. A more precise ultrafine pattern may be simply formed using the nanoimprint lithography process.

The nano-template 50 may contain a material capable of being cured by irradiation with UV light. Also, the nano-template 50 may contain an insulating material. In an example, the nano-template 50 may contain a polymethylsiloxane (PDMS)-based polymer.

The nanoimprint lithography process will now be described.

Figure 3A:
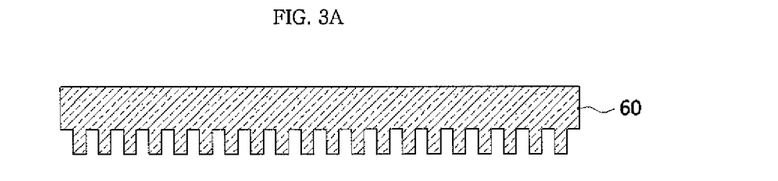
FIGS. 3A through 3E are cross-sectional views illustrating a nanoimprint lithography process according to an example embodiment of the present invention.

Referring to FIG. 3A, a nanoimprint stamp 60 having a plurality of pillars may be prepared. The nanoimprint stamp 60 may be a soft stamp formed of a polymer, such as PDMS. A PDMS stamp may be highly resistant to a high temperature due to the characteristics of Si—O bonds, nontoxic, and highly elastic. Also, the nanoimprint stamp 60 may be a hard stamp formed of glass or silicon (Si). In this case, the soft stamp or hard stamp may be a stamp reproduced from a master stamp having a surface on which an opposite pattern is formed.

Figure 3B:
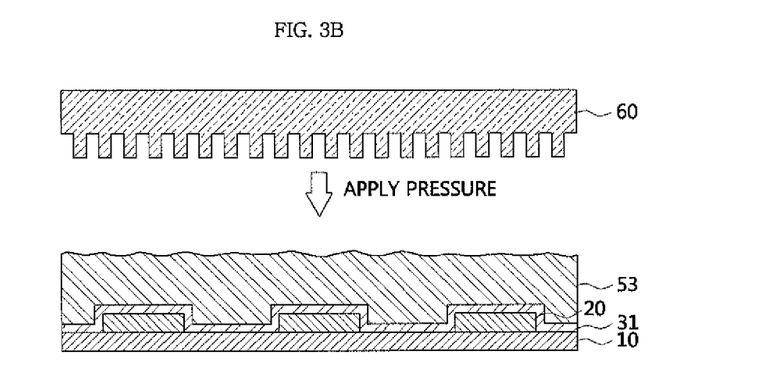

Referring to FIG. 3B, a light-curable resist 53 may be coated on the entire surface of a metal oxide seed layer 31, and pressure may be applied to the light-curable resist 53 using the nanoimprint stamp 60. The light-curable resist 53 may be coated using a spin coating process, a deep coating process, a drop coating process, or a spray coating process. The applying of pressure using the nanoimprint stamp 60 may be performed under a pressure of about 5 bar to about 20 bar for about 5 minutes to about 10 minutes.

Figure 3C:
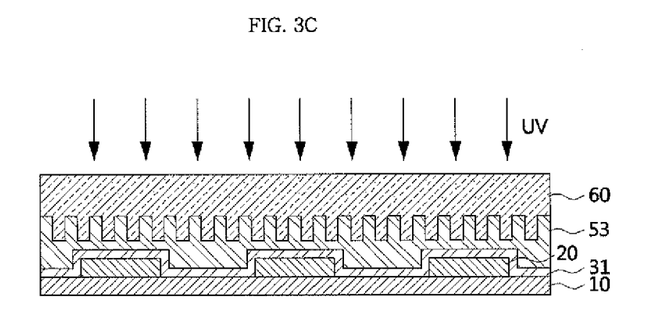
Figure 3D:
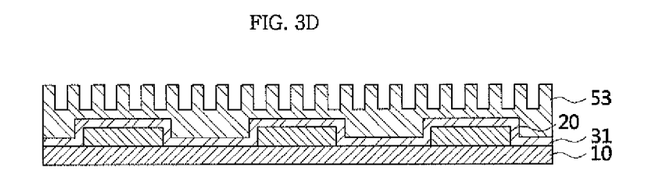

Referring to FIGS. 3C and 3D, after curing the light-curable resist 53 by irradiation with light, the nanoimprint stamp 60 may be removed. The light may be UV light. When irradiated with the UV light, the light-curable resist 53 may be cured to form a pattern having an opposite shape to the pattern of the nanoimprint stamp 60. The pattern may be a pattern having a plurality of imprinted holes.

Figure 3E:
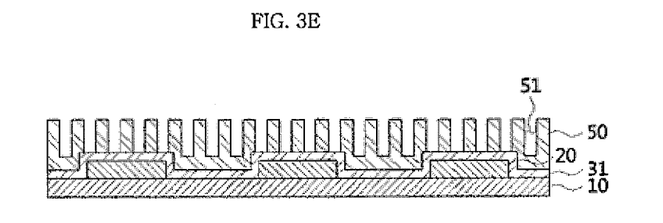

Referring to FIG. 3E, the residual light-curable resist 53 in the imprinted holes may be etched until the metal oxide seed layer 31 formed on a bottom electrode 20 is exposed, thereby forming a nano-template 50 having a plurality of vertical holes 51. In this case, since the bottom electrode 20 has a predetermined height, the metal oxide seed layer 31 formed in a region where the bottom electrode 20 is not disposed may not be exposed. Accordingly, a metal oxide nanostructure 30 may be selectively formed only on the bottom electrode 20 based on the above-described point.

Figure 2D:
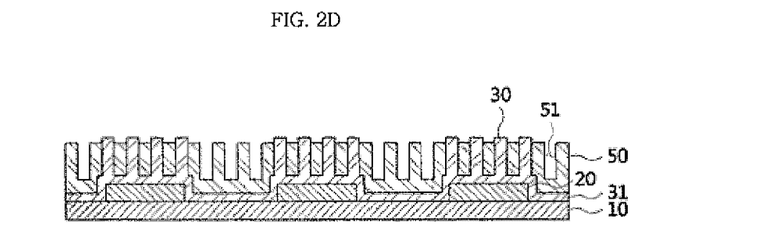

Referring to FIG. 2D, the metal oxide seed layer 31 exposed through the holes 51 of the nano-template 50 may be grown to form a metal oxide nanostructure 30. The metal oxide nanostructure 30 may be a metal oxide nanorod formed in a vertical direction with respect to the substrate 10. In an example, the metal oxide nanostructure 30 may be formed using a hydrothermal synthesis process.

Specifically, the substrate on which the nano-template 50 having the plurality of vertical holes 51 is disposed may be submersed in a hydrothermal solution. For example, the hydrothermal solution may be a distilled water solution in which Zn acetate, Zn nitrate, or a derivative thereof is dissolved. However, the present invention is not limited thereto, and the hydrothermal solution may be varied according to the kind of the metal oxide nanostructure 30 to be formed. In this case, the pH of the hydrothermal solution may be controlled by adding sodium hydroxide (NaOH) or ammonium hydroxide ($NH_4OH$).

The hydrothermal solution may be maintained at a predetermined temperature so that the metal oxide nanostructure can be formed on the bottom electrode 20. In an example, the metal oxide nanostructure 30 may be grown along the plurality of vertical holes 51 formed on the bottom electrode 20. The metal oxide nanostructure 30 may be a plurality of metal oxide nanorods. The metal oxide nanorods may be grown from the metal oxide seed layer 31 through the vertical holes 51. In this case, the shape of the metal oxide nanostructure 30 may be changed by controlling an interval between the holes 51 or the diameter of the holes 51.

Since the metal oxide seed layer 31 formed in a region where the bottom electrode 20 is not disposed is shielded by the nano-template 50, the metal oxide nanorod may not be grown during hydrothermal synthesis. That is, the metal oxide nanorod may be grown only on the bottom electrode 20. Accordingly, the metal oxide nanorod may be selectively vertically grown only on the bottom electrode 20 based on the above-described point.

Figure 2E:
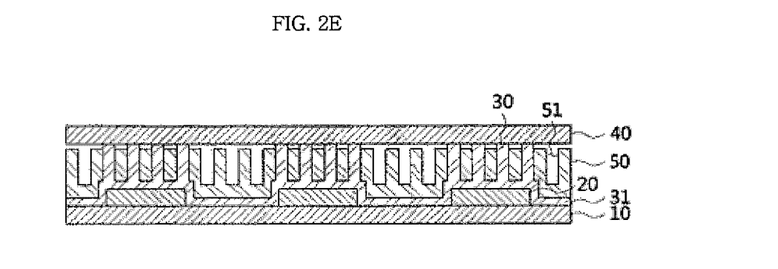

Referring to FIG. 2E, a top electrode 40 may be formed on the metal oxide nanostructure 30.

In an example, the top electrode 40 may be formed using ordinary photolithography and lift-off processes. For example, deionized (DI) water may be used as a lift-off solution. In this case, a protection layer (not shown) containing a material that may be dissolved in the DI water may be coated before coating photoresist (PR), and then a photolithography process may be performed. The protection layer may be, for example, polyvinyl alcohol (PVA). In this case, the protection layer may prevent damage to the nano-template 50 during formation of a PR pattern required to define the top electrode 40. Since the nano-template 50 contains an insulating material, the top electrode 40 may be prevented from directly electrically contacting the bottom electrode 20. The top electrode 40 may be formed to perpendicularly intersect the bottom electrode 20.

The top electrode 40 may be a TCO electrode or a metal electrode. Selectively, the nano-template 50 may be removed after forming the top electrode 40.

The present invention will now be described in more detail with reference to the following experimental examples. Also, the present invention is not restricted by the following experimental examples.

EXPERIMENTAL EXAMPLE

1. Fabrication of Bottom Electrodes

ITO electrodes were formed on a glass substrate using a photolithography process. Specifically, an ITO layer was deposited on the glass substrate and coated with an nLOF 2020 negative PR. After defining electrode regions using a chromium (Cr) etching mask, the ITO layer was dry etched with argon (Ar) plasma (50 sccm, 100 mTorr, 200 W, 120 seconds).

2. Fabrication of ZnO Seed Layer

A sol-gel precursor was spin-cast on the glass substrate having the ITO electrodes, and then followed by an annealing process. First, zinc acetate (2.2 g, $Zn(CH_3COO)_2$, Aldrich) was dissolved in 40 mL of anhydrous n-propanol. Triton X-100 (t-oct-$C_6H_4$—$(OCH_2CH_2)_xOH$, x=9-10, Aldrich), which was a nonionic surfactant, and monoethanolamine ($H_2NCH_2CH_2OH$, Aldrich) were added (with the same molar ratio) to the zinc acetate solution. The mixture was stirred for about 30 minutes at a temperature of about 60° C. to prepare a viscous transparent sol. After cooling the viscous transparent sol to room temperature, the sol was filtered using a 0.45 μm ADVANTEC® PTFE filter (hydrophilic) to remove contaminants and then stored for one day at room temperature. Next, the ZnO seed layer was fabricated by spin coating the prepared ZnO sol at 5000 rpm on the glass substrate having the ITO electrodes and then thermally treated at a temperature of about 550° C. for 30 minutes.

3. Fabrication of Polymer Template

UV-nanoimprint lithography (UV-NIL) was used to fabricate a polymer template with a plurality of vertical holes on the ZnO seed-coated ITO glass substrate. To begin with, a UV-curable resist was spin-coated on the ZnO seed-coated ITO glass substrate for about 200 seconds at 6000 rpm. In this case, the UV-curable resist was formulated with PDMS (Gelest, 87%), a cross-linker (ethylene glycol dimethacrylate, Aldrich, 10%), and a radical initiator (Irgacure 184, Ciba, 3%). A transparent stamp having periodic pillars with a diameter of 300 nm at a 600 nm pitch size was fabricated by laser holographic lithography. The imprint resist was subsequently sandwiched between the stamp and the seed layer and then UV irradiated through the transparent stamp to cure the resist for 5 minutes while an imprinting pressure of 5 bar was applied. The stamp was finally detached from the imprinted resist to form a polymer template. Dry etching was performed with methane ($CH_4$) plasma gas in a vertical direction to remove any residual layer in the holes and to expose the seed layer.

4. Growth of ZnO Nanorods

DI water containing 0.05M zinc nitrate hexahydrate (Zn $(NO_3)_2.6H_2O$, 99.5% purity, Aldrich), and 0.07M hexamethylenetetramine (HMT) ($C_6H_{12}N_4$, 99.5% purity, Aldrich) was used as a growth solution. Here, the pH of the growth solution was maintained at 7. The ITO glass substrate with the polymer template was then immersed into the growth solution in a convection oven at a temperature of about 93° C. for about 1 hour to grow ZnO nanorods.

5. Fabrication of Top Electrode

Platinum (Pt) electrodes were formed on the ZnO nanorods using photolithography and lift-off processes. Initially, a polyvinyl alcohol (PVA)/PR bi-layer was formed to use DI water as a lift-off solution. 4 wt % PVA dissolved in DI water was pre-coated prior to PR coating, and the photolithography process was performed. After development, the PR patterns were transferred to the PVA layer by oxygen plasma (50 sccm, 20 mTorr, 30 seconds) and then Pt (150 nm) was deposited. Finally, the sample was immersed in DI water as a lift-off process (at a temperature of about 60° C.) to remove the PVA layer and form the Pt top electrodes.

FIGS. 4A through 4E are scanning electron microscopy (SEM) images showing steps of a method of manufacturing an electronic device according to an example embodiment of the present invention.

Figure 4A:
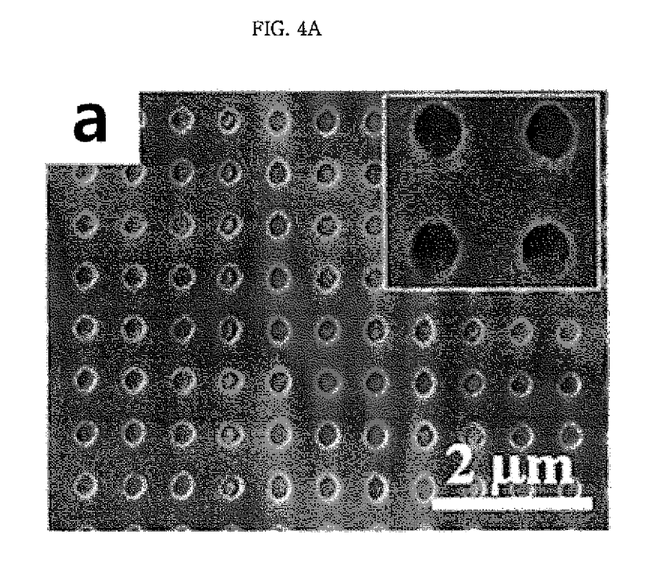
FIGS. 4A through 4E are scanning electron microscopy (SEM) images showing steps of a method of manufacturing an electronic device according to an example embodiment of the present invention.

Referring to FIG. 4A, it can be confirmed that a polymer template has a plurality of vertical holes arranged periodically. It can be seen that the holes are arranged at a diameter of about 300 nm at a 600 nm pitch size. Also, it can be confirmed that ITO electrodes disposed under the polymer template have a width of about 2 μm. It can be confirmed that holes disposed in the ITO electrodes, among the plurality of holes formed in the polymer template, are in four rows.

Figure 4B:
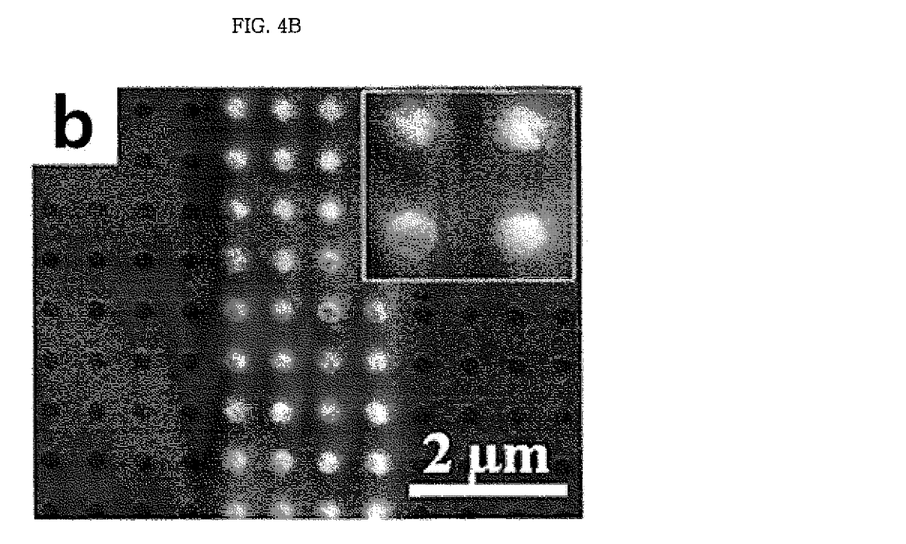
Figure 4C:
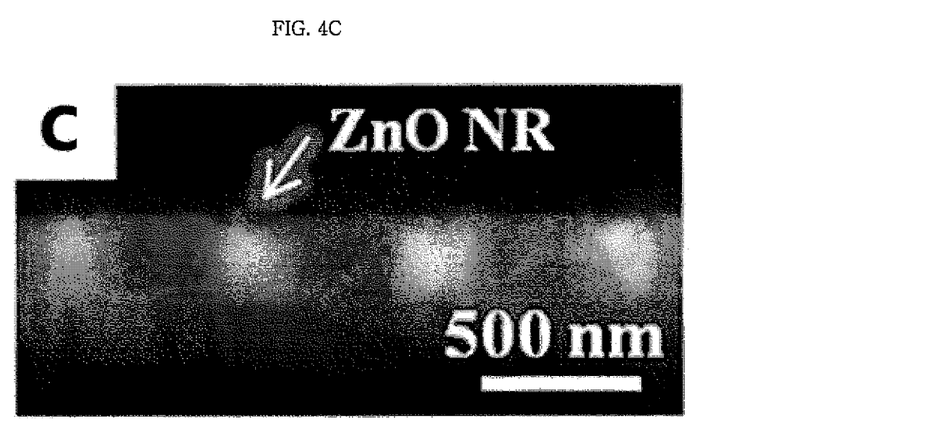

Referring to FIGS. 4B and 4C, it can be demonstrated that ZnO nanorods are vertically grown on only four rows of each of the ITO electrodes. It can be confirmed that the ZnO nanorods are formed at a diameter of about 300 nm apart from one another at a 600 nm pitch size. Also, it can be seen that the ZnO nanorods have a predetermined height, which is equal to the thickness of the polymer template.

Figure 4D:
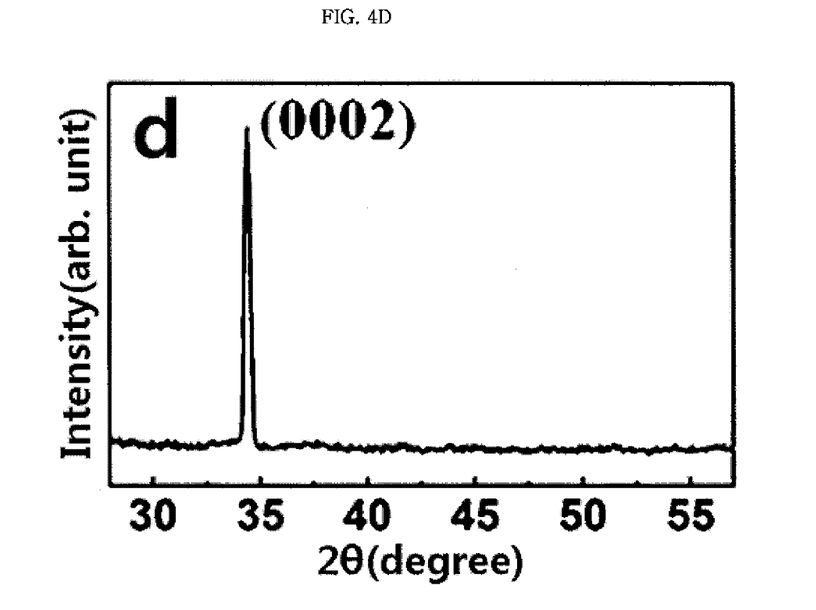

Referring to FIG. 4D, the X-ray diffraction peak of the ZnO nanorods shows its dominant (0002) crystal plane ($2\theta=34.2°$), demonstrating that the ZnO nanorods are vertically grown in the [0001] direction.

Figure 4E:
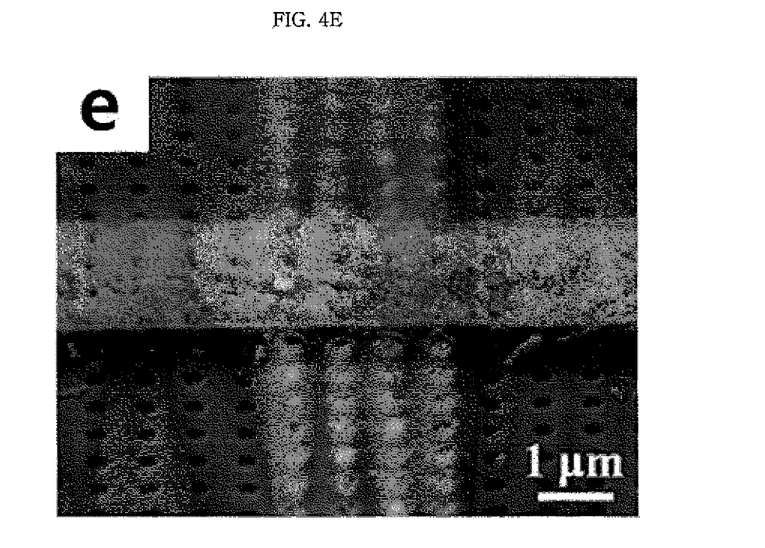

Referring to FIG. 4E, it can be demonstrated that Pt electrodes are formed on the ZnO nanorods with a predetermined height to vertically intersect the ITO electrodes. It can be seen that each of intersection regions between the ITO electrodes and the Pt electrodes has an area of 2 μm×2 μm and 16 (4×4) ZnO nanorods are disposed in each of the intersection regions.

Figure 5:
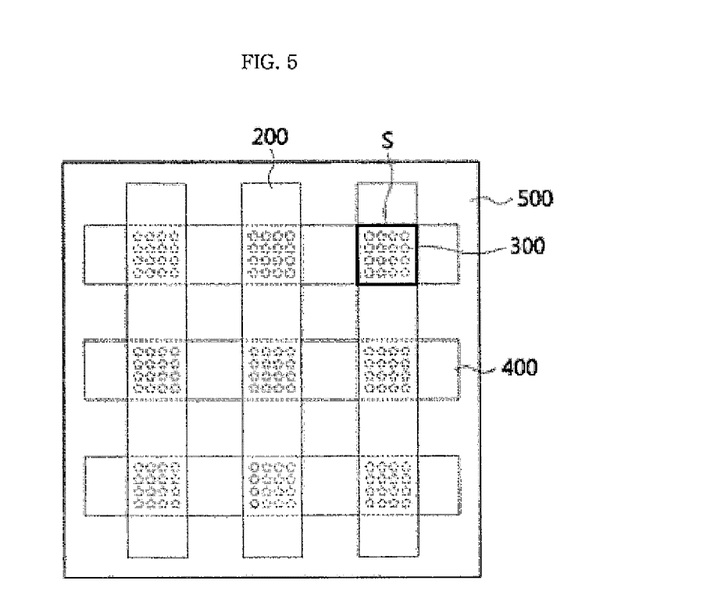
FIG. 5 is a plan view of a touch panel according to an example embodiment of the present invention.

FIG. 5 is a plan view of a touch panel according to an example embodiment of the present invention.

Figure 6:
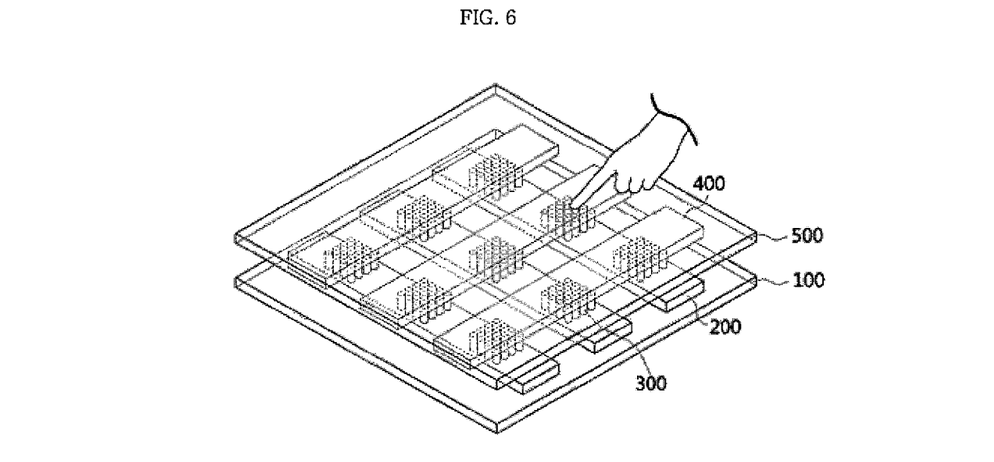
FIG. 6 is a perspective view of a touch panel according to an example embodiment of the present invention.

FIG. 6 is a perspective view of a touch panel according to an example embodiment of the present invention.

Referring to FIGS. 5 and 6, a lower substrate 100 and an upper substrate 500 may be disposed opposite each other. A plurality of bottom electrodes 200 may be arranged on the lower substrate 100 parallel to one another. Each of the lower and upper substrates 100 and 500 may be a glass substrate or a transparent film substrate. For example, the film substrate may be polyethyleneterephthalate (PET), polymethylmethacrylate (PMMA), polypropylene (PP), polyethylene (PE), polyethylene naphthalene (PEN), polycarbonate (PC), polyethersulfone (PES), polyimide (PI), polyvinylalcohol (PVA), a cyclic olefin copolymer (COC), or a styrene polymer, but the present invention is not limited thereto.

The plurality of bottom electrodes 200 arranged on the lower substrate 100 parallel to one another may vertically intersect the plurality of top electrodes 400 arranged on a bottom surface of the upper substrate 500 parallel to one another. Each of the plurality of bottom electrodes 200 and the plurality of top electrodes 400 may be connected to a power line (not shown). Each of the bottom electrodes 200 and the top electrodes 400 may be a transparent electrode. For instance, the transparent electrode may contain ITO, doped ZnO(Al-doped ZnO (AZO), Ga-doped ZnO (GZO), In-doped ZnO (IZO), In/Ga-doped ZnO (IGZO), Mg-doped ZnO (MZO)), Al-doped or Ga-doped MgO, Sn-doped $In_2O_3$, F-doped $SnO_2$, and Nb-doped $TiO_2$.

A plurality of touch cells S may be disposed in intersection regions between the bottom electrodes 200 and the top electrodes 500. Accordingly, the touch cells S may be arranged in a matrix. In this case, since a cell touched by a user does not affect adjacent cells, a multi-touch function may be embodied.

Each of the touch cells S may include a piezoelectric nanostructure 300. The piezoelectric nanostructure 300 may produce a piezoelectric effect to cause polarization due to a potential difference with application of an external pressure. That is, when a user applies pressure to the surface of the upper substrate 500 using a predetermined input unit, such as a pen or a finger, an external force may be transmitted to the piezoelectric nanostructure 300 through the top electrode 400. In this case, positive charges and negative charges may be polarized on both sides of the piezoelectric nanostructure 300. When the polarization occurs as described above, electromotive force (EMF) may occur between the top and bottom electrodes 400 and 200 that may contact both sides of the piezoelectric nanostructure 300. Accordingly, an external terminal (not shown) electrically connected to the top and bottom electrodes 400 and 200 may generate an electric signal. A touch position may be detected using the electric signal. In this case, since the EMF generated during the polarization may be used, the touch position may be detected without supplying an additional power source.

In an example, the piezoelectric nanostructure 300 may be a plurality of metal oxide nanorods arranged periodically. For instance, the piezoelectric nanostructure 300 may contain at least one selected from zinc oxide (ZnO), magnesium oxide (MgO), titanium oxide ($TiO_2$), tin oxide ($SnO_2$), and cadmium oxide (CdO). The piezoelectric nanostructure 300 may maintain an interval between the bottom and top substrates 100 and 500 constant so that a typically used dot spacer can be omitted.

Each and every one of the plurality of touch cells S may include the same number of metal oxide nanorods. The respective metal oxide nanorods may be disposed an equal distance apart from one another and have the same diameter and height. Accordingly, all the touch cells S may have the same responsivity to pressure applied with a user's touch. Thus, the touch panel may be set to operate all the touch cells S only under a predetermined pressure or more and not to operate the touch cells S with a light touch.

According to an electronic device of the present invention, since every pixel formed by an intersection region includes the same number of metal oxide nanorods, uniform device performance can be obtained. Also, since the respective nanorods are disposed apart from one another, interference does not occur between adjacent nanorods during transport of electrons, thereby resulting in high electron transport capability. Also, in a method of manufacturing an electronic device according to the present invention, a nanostructure including a plurality of metal oxide nanorods with the same diameter and height can be selectively formed only on a bottom electrode using a nano-template in a simple, easy way.

Furthermore, according to a touch panel of the present invention, touch cells can be disposed in a matrix to enable a multi-touch function. In addition, since every touch cell includes the same number of piezoelectric nanorods, all the touch cells can have the same responsivity to pressure applied with a user's touch. Thus, a precise touch point can be detected. Moreover, the touch panel can be set to operate all the touch cells only under a predetermined pressure or more and not to operate the touch cells S with a light touch.

However, technical effects of the present invention are not limited to the above-described effects, and other unmentioned effects will be apparent from the following descriptions.

While example embodiments of the present invention and their advantages have been described in detail, it should be understood that various changes, substitutions and alterations may be made herein without departing from the scope of the invention.

What is claimed is:

1. A method of manufacturing an electronic device, comprising:
    forming a plurality of bottom electrodes arranged on a substrate parallel to one another;
    forming a metal oxide seed layer on the entire surface of the substrate having the bottom electrodes;
    forming a nano-template having a plurality of vertical holes on the metal oxide seed layer;
    forming metal oxide nanostructures on the bottom electrodes in a vertical direction with respect to the substrate by growing the metal oxide seed layer exposed through the vertical holes of the nano-template; and
    forming top electrodes on the metal oxide nanostructures for perpendicularly intersecting the bottom electrode,
    wherein the plurality of vertical holes are placed on the bottom electrodes periodically,
    wherein the metal oxide nanostructures are formed in intersection regions between the bottom electrodes and the top electrodes.

2. The method of claim 1, wherein the nano-template contains an insulating polymer.

3. The method of claim 1, wherein the forming of the nano-template comprises:
    preparing a nanoimprinting stamp having a plurality of pillars;
    coating a light-curable resist on the entire surface of the metal oxide seed layer and applying pressure using the nanoimprinting stamp;
    irradiating the light-curable resist with light to cure the light-curable resist and removing the nanoimprinting stamp; and
    etching the residual light-curable resist in the imprinted holes until the metal oxide seed layer formed on the bottom electrodes is exposed.

4. The method of claim 1, wherein the metal oxide nanostructures are a plurality of metal oxide nanorods periodically aligned in a vertical direction.

5. The method of claim 1, wherein the forming of the metal oxide nanostructures comprises:
    disposing the substrate on which the nano-template having the plurality of vertical holes is formed in a hydrothermal solution; and
    growing the metal oxide nanostructures along the holes.

* * * * *